March 17, 1936.   J. F. PAGENDARM   2,034,484
CORN POPPING AND VENDING MACHINE
Filed Feb. 23, 1935   8 Sheets-Sheet 1

INVENTOR.
John F. Pagendarm
BY Townsend and Loftus
ATTORNEYS.

March 17, 1936.  J. F. PAGENDARM  2,034,484
CORN POPPING AND VENDING MACHINE
Filed Feb. 23, 1935  8 Sheets-Sheet 2

INVENTOR.
John F. Pagendarm.
BY
Townsend Loftus
ATTORNEYS.

March 17, 1936.  J. F. PAGENDARM  2,034,484
CORN POPPING AND VENDING MACHINE
Filed Feb. 23, 1935    8 Sheets-Sheet 3

INVENTOR.
John F. Pagendarm
BY
Townsend Loftus
ATTORNEYS.

March 17, 1936.　　　J. F. PAGENDARM　　　2,034,484
CORN POPPING AND VENDING MACHINE
Filed Feb. 23, 1935　　　8 Sheets-Sheet 4

INVENTOR.
John F. Pagendarm
BY
Townsend and Loftus
ATTORNEYS.

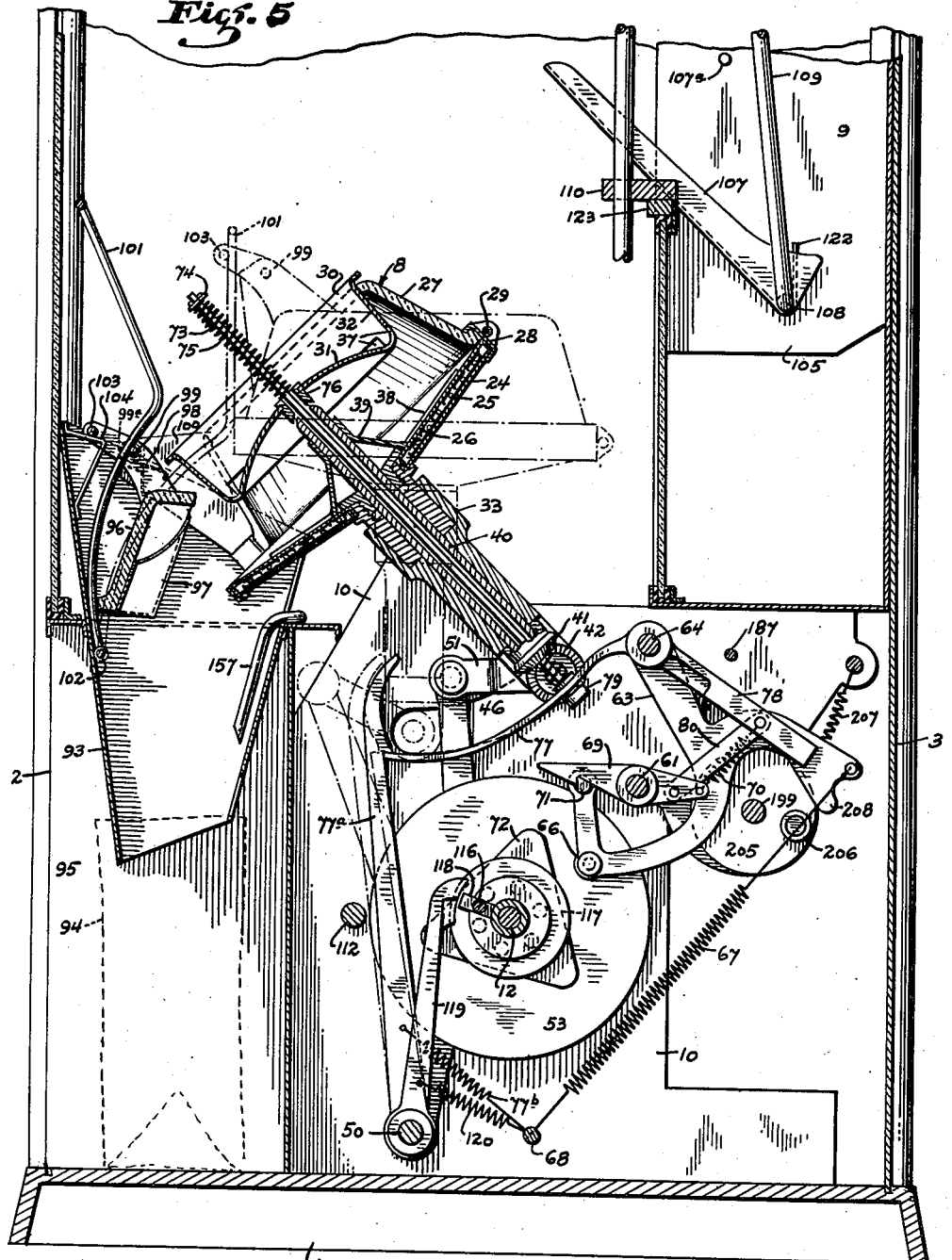

March 17, 1936.  J. F. PAGENDARM  2,034,484
CORN POPPING AND VENDING MACHINE
Filed Feb. 23, 1935  8 Sheets-Sheet 6

INVENTOR.
John F. Pagendarm.
BY
Townsend and Loftus.
ATTORNEYS.

March 17, 1936.　　J. F. PAGENDARM　　2,034,484
CORN POPPING AND VENDING MACHINE
Filed Feb. 23, 1935　　8 Sheets-Sheet 7

INVENTOR.
John F. Pagendarm.
BY
Townsend & Loftus
ATTORNEYS.

March 17, 1936.  J. F. PAGENDARM  2,034,484
CORN POPPING AND VENDING MACHINE
Filed Feb. 23, 1935  8 Sheets-Sheet 8
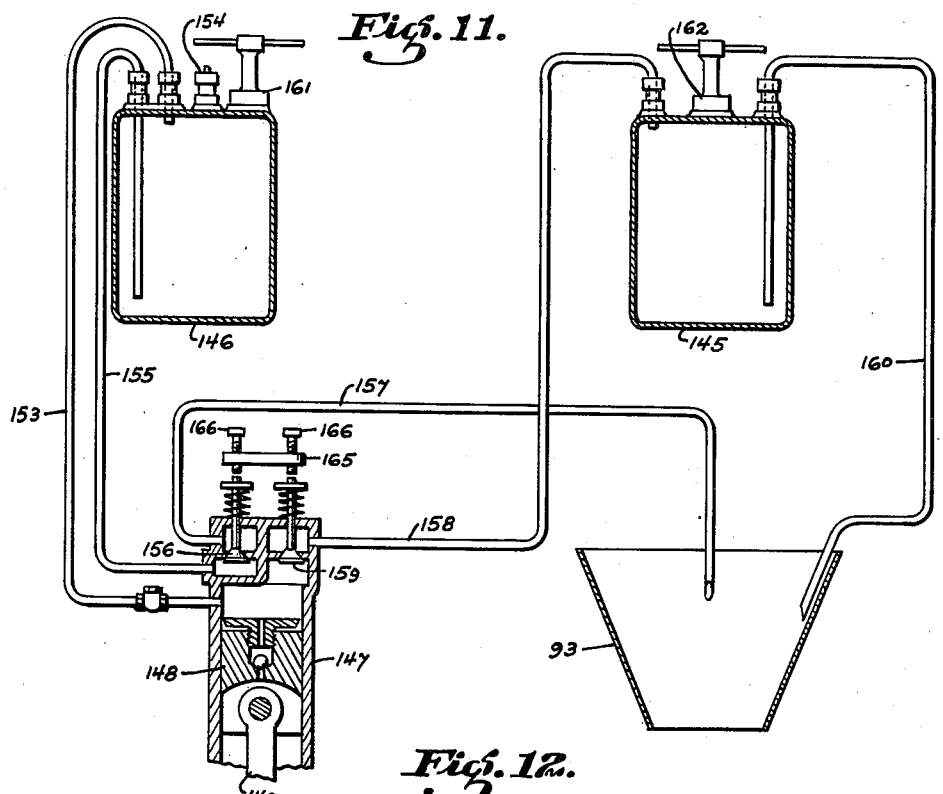
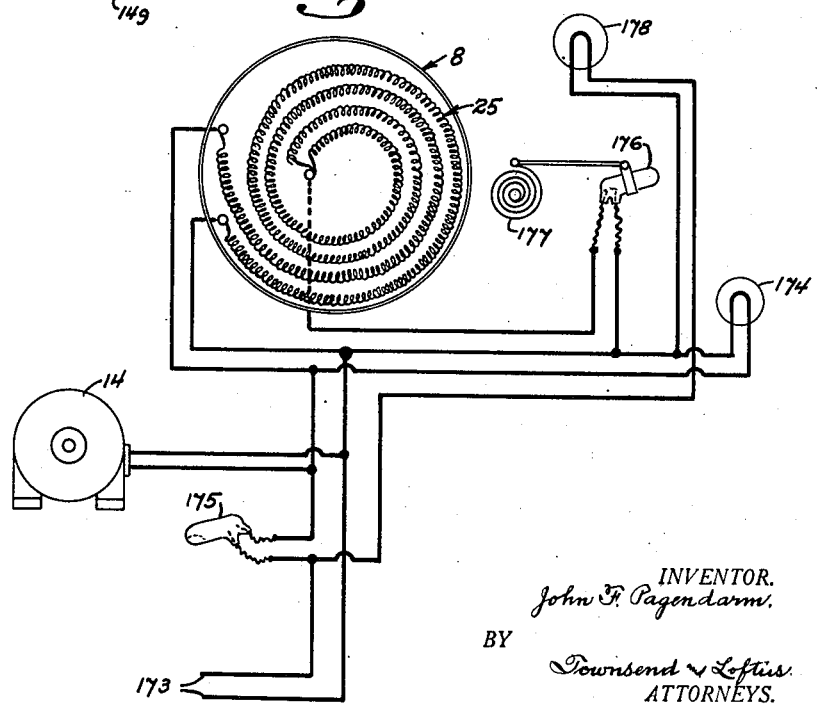
INVENTOR.
John F. Pagendarm.
BY
Townsend & Loftus
ATTORNEYS.

Patented Mar. 17, 1936

2,034,484

UNITED STATES PATENT OFFICE 2,034,484

CORN POPPING AND VENDING MACHINE

John F. Pagendarm, Oakland, Calif.

Application February 23, 1935, Serial No. 7,826

9 Claims. (Cl. 194—48)

This invention relates to corn popping machines and particularly to a machine that will automatically pop and deliver a certain quantity of corn upon the deposit of a coin in the machine.

It is the object of the invention generally to improve upon machines of this character and to provide a machine that will through relatively simple mechanism perform all of the operations necessary to the popping, seasoning and delivering to the consumer a certain quantity of popped corn in a fresh and sanitary condition as well as furnishing to a consumer a bag to receive the corn as it is discharged from the machine, all automatically upon the reception by the machine of a coin of the proper denomination. It is also within the object of the invention to provide means for insuring the delivery of a predetermined quantity of corn upon each operation and means operable upon failure of this quantity being delivered to return the coin paid by the consumer and also to return any coins inadvertently placed in the machine while it is in operation.

Further objects and advantages of the invention are made apparent in the following specification wherein reference is made in detail to the accompanying drawings.

In the drawings:

Fig. 5 is a sectional view taken on the line V—V of Fig. 3.

Fig. 11 is a diagrammatic view of the mechanism by means of which the corn popped by the machine is supplied with seasoning as it is delivered to the consumer.

Fig. 12 is a diagrammatic view of the electrical circuit employed in illuminating the machine, heating the popper head and energizing the motor which drives the operating mechanism.

Figure 1:
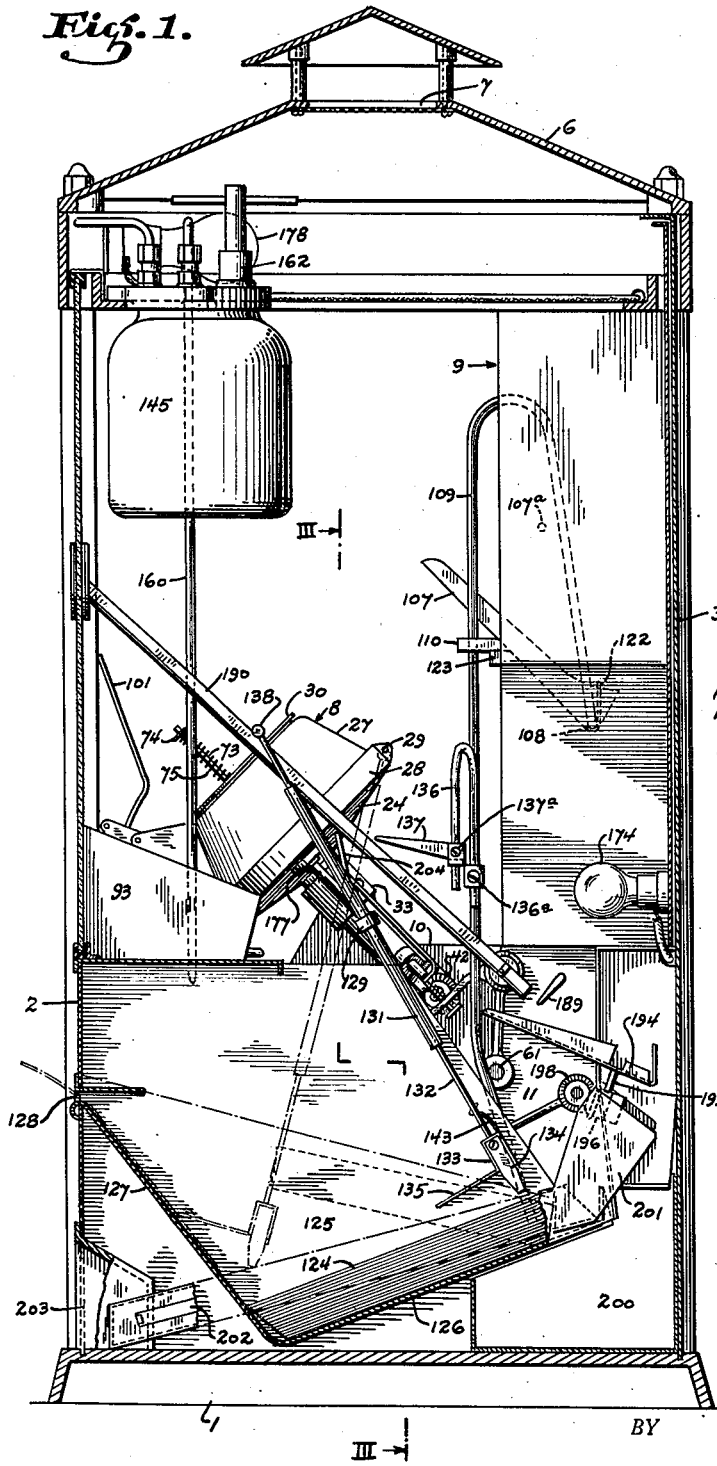
Fig. 1 is a side elevation of a corn popping machine embodying my invention, with a side wall thereof removed to disclose the operating mechanism, and with parts shown in section.
Figure 9:
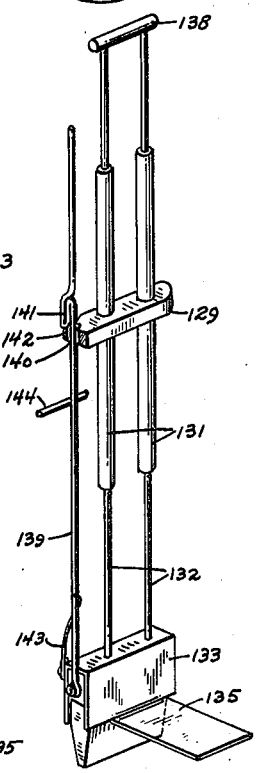
Fig. 9 is a perspective view of a portion of the bag feeding mechanism employed in the machine.

Referring to the drawings and particularly to Figs. 1, 2, 3 and 4, the machine is shown as enclosed in a casing which comprises a base member 1 supporting vertically extending front and rear walls 2 and 3, respectively, and side walls 4 and 5. A top 6 supported on the upper edges of the walls encloses the upper end of the casing and is provided with a screened vent opening 7 to permit the escape of hot gases resulting from the operation of the machine.

Within the casing are provided a corn popper generally shown at 8; a bin 9 for the storage of unpopped corn; means for delivering corn from the bin 9 to the popper 8; means for heating and agitating the corn in the popper and causing it to be delivered after it has been popped, as well as means for providing the purchaser with a bag to receive the corn; means for applying seasoning to the corn; and other means all to be more specifically referred to as the description of the machine proceeds.

For the sake of clearness of the description, the following specification will be divided into parts, each part pertaining to one unit of the machine as nearly as possible. However, as all of the units are driven by a single motor and as several of the units receive their motions or parts of their motions from a main drive shaft carrying cams, clutches and the like to initiate the several movements, a description of this shaft together with the means for rotating it at a reduced speed relative to the motor will first be set forth.

The drive mechanism

Figure 2:
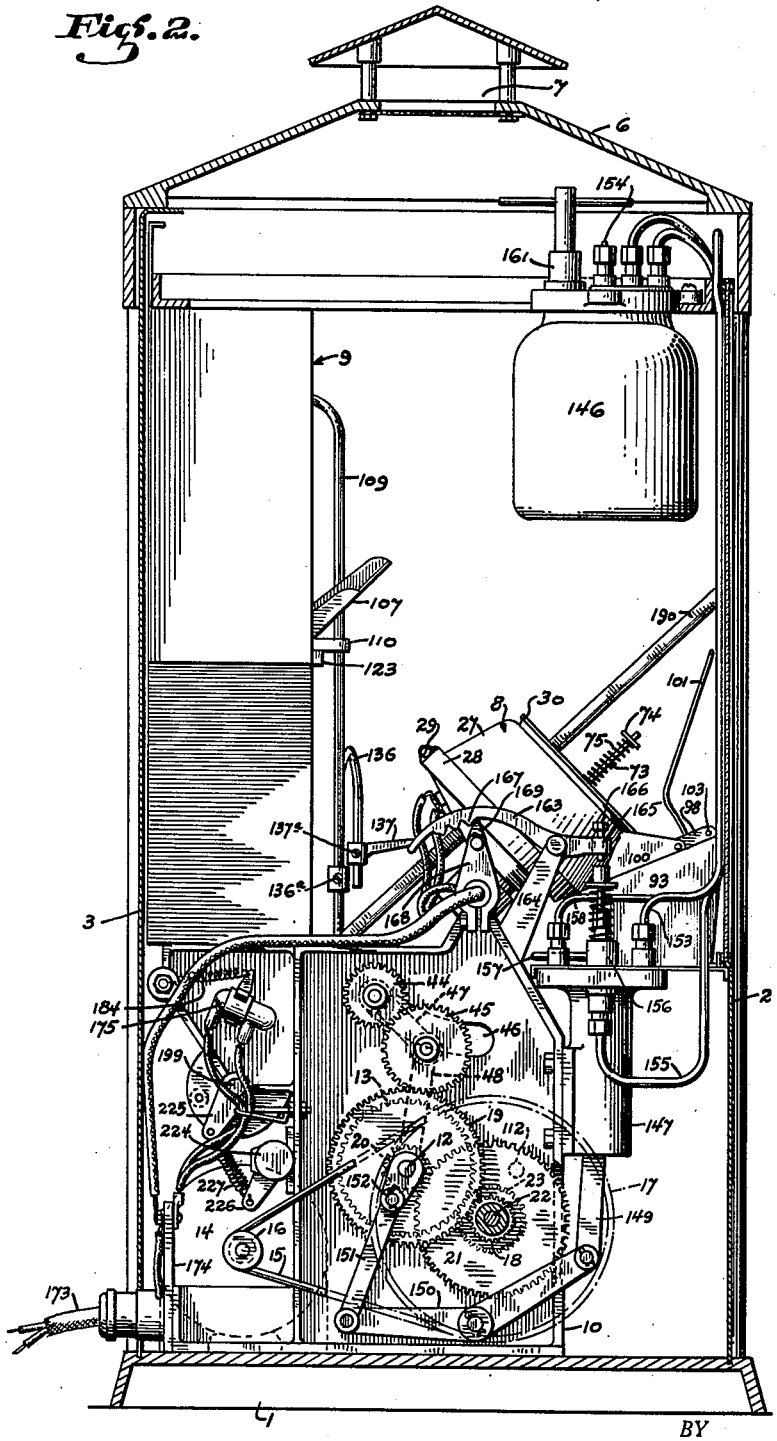
Fig. 2 is a side elevation of the same showing the side of the machine opposite to that shown in Fig. 1, and with parts shown in section.
Figure 3:
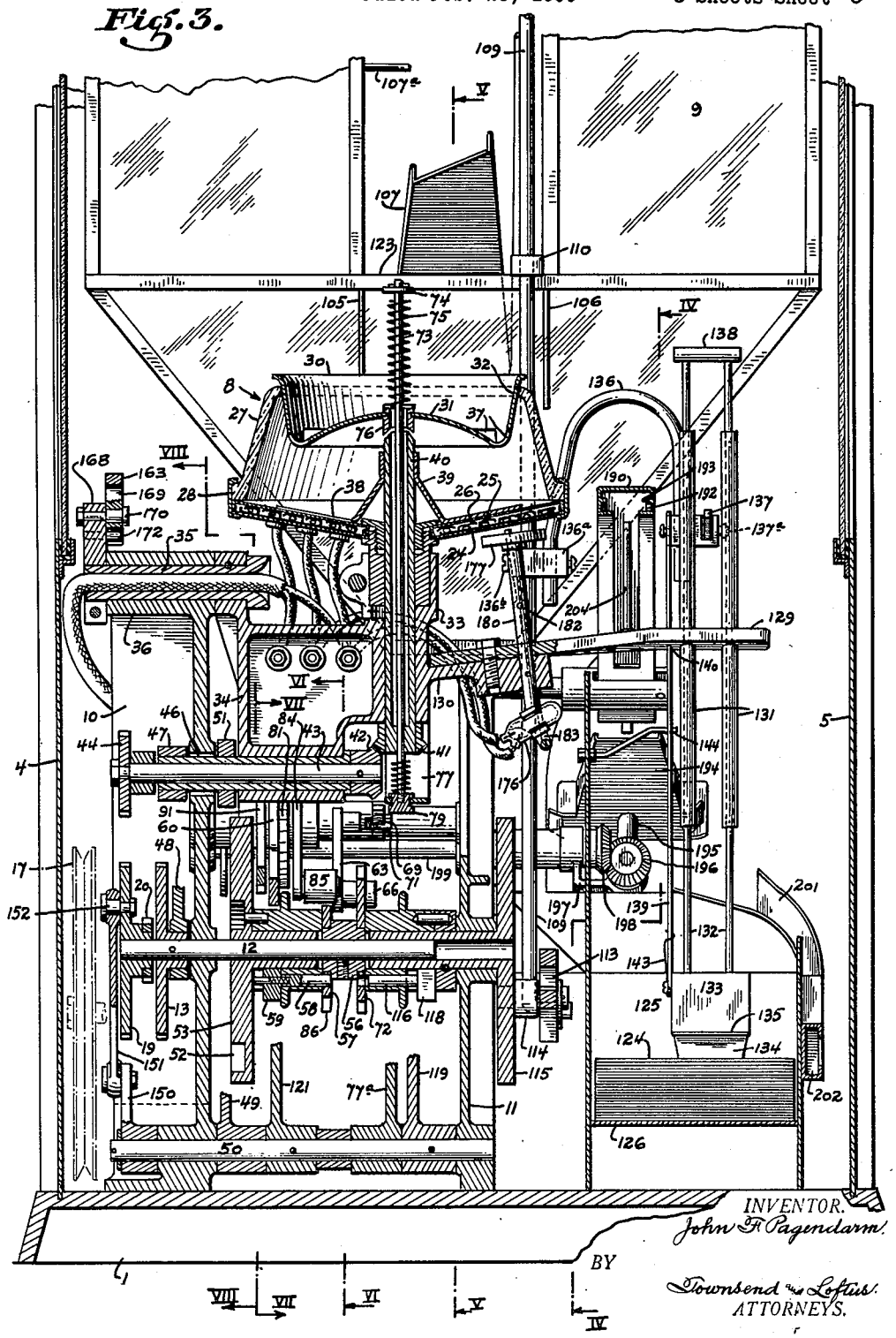
Fig. 3 is a central vertical section of the operating mechanism of the machine taken on line III—III of Fig. 1, but showing the popper head in a vertical position.

The principal parts of the operating mechanism of the machine are supported for operation between spaced vertically extending parallel frames 10 and 11, see Figs. 2 and 3, suitably secured to the base 1 and parallel to the side walls 4 and 5 of the casing. A main shaft 12 is journaled for rotation in the frames 10 and 11 and is provided with a gear 13 at one end through which a drive is imparted to it by means of a motor 14, (see Fig. 2) disposed behind the frames 10 and 11 adjacent the rear wall 3 of the casing. The shaft 12 is driven at a suitably reduced rate of speed through the following reduction drive.

A belt 15 riding over the motor pulley 16 drives a large pulley 17 to the hub of which is secured a pinion 18. The pinion 18 meshes with a spur gear 19 which carries a pinion 20 meshing with a spur 21 freely rotatable on a stub shaft 22 which supports the pulley 17. The latter spur gear 21 also carries a pinion 23 which meshes with the said gear 13 which is secured to the shaft 12, thereby causing the same to be rotated at a reduced rate of speed upon operation of the motor 14.

*Corn popping mechanism*

The corn popping mechanism, which is best illustrated in Figs. 3 and 5, comprises a popper head composed of a bottom plate formed of a heater unit 24 preferably containing an electrical resistance element, such as illustrated at 25 in Fig. 5, embedded in suitable dielectric material and covered by a metallic heat conducting plate 26. The side walls of the popper head are shown at 27 as frusto-conical in shape and are preferably formed of a transparent heat resisting material such, for example, as "Pyrex". These side walls are secured to the bottom 24 by a flanged ring 28 which may be clamped in position by perforated ears and a screw, as illustrated at 29 in Fig. 5. The top consists of a floating cover member 30 having a generally convex bottom wall 31 and upwardly flanged side walls 32 and mounted for vertical movement in a manner and for a purpose that will hereinafter be more fully set forth.

The popper head is supported by a central bearing member 33 carried by a frame 34, which frame is pivotally mounted on a hollow shaft 35 journaled in a bearing 36 on the main frame 10. Unpopped corn is fed to the interior of the popper head by being poured upon the convex portion 31 of the cover member 30, from which position it gravitates through spaced perforations 37 formed at the junction of the bottom 31 and the side walls 32.

Upon entering the popper head, the corn rests on the upper surface of the heating unit 24 and in order to agitate the corn thereon and prevent its remaining stationary on the heating unit before and during the popping action caused by the heat, I provide an agitator which consists of generally radially extending blades 38 supported by a central hub 39 fixed to a hollow spindle 40 extending downwardly through the bearing member 33 and provided at its lower end with a bevel gear 41.

The blades 38 are caused to revolve rapidly over the top surface of the heater unit 24 after the corn has been deposited in the popper head, and during the entire cycle of operation of the machine, by meshing of the bevel gear 41 with a bevel gear 42 on a spindle 43 journaled in the lowermost end of the frame 34 and provided at its outer end with a gear 44. This gear 44 is driven by a gear 45 meshing with it and meshing also with the gear 19. By virtue of the pivotal mounting of the popper head and its supporting framework, which comprises the bearing 36 and shaft 35, the popper head is permitted to rock forwardly for the purpose of discharging its contents at a proper time and consequently the gear 44, which drives the agitator blades 38 within the popper head and which is carried by the rocking frame 34, occasionally moves through an arcuate path. For this reason the main frame 10 is provided with an arcuate slot 46 to accommodate the movement of the shaft supporting the gear 44 and in order that the operation of the agitators 38 will not be discontinued during the forward rocking movement of the popper head, the gear 45 intermediate the gears 44 and 19 is carried by pivoted links 47 and 48, the link 47 being pivoted at one end for swinging movement about the axis of the gear 44, the link 48 being pivoted for swinging movement at one end about the axis of the gear 19 or on the main shaft 12, and the opposite ends of both the links 47 and 48 being connected for pivotal movement with relation to each other and coaxially with the gear 45. This permits the gear 44 to swing within the limits of the arcuate slot 46 while being continuously in mesh with the gears 45 and 19.

The machine is put into operation by coin controlled mechanism to be set forth in detail hereinafter which causes energization of the heating unit in the popper head and which starts the motor 14 to drive the main shaft 12 and to cause operation of the agitator blades 38 through the mechanism just described. Unpopped corn is automatically deposited in the popper head by means also to be described in detail and when the corn has been popped, the popper head is tilted forwardly into the discharge position illustrated in Figs. 1, 4 and 5.

Figure 8:
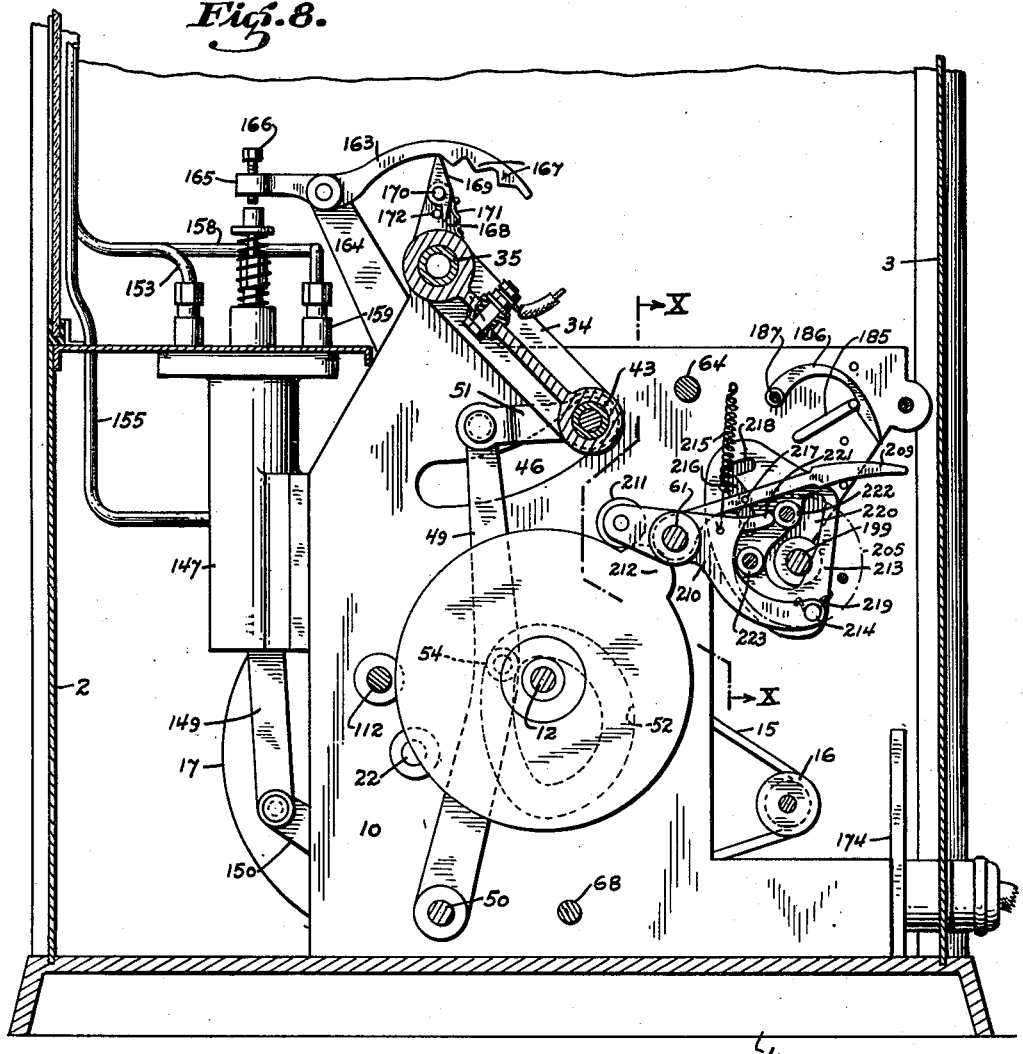
Fig. 8 is a sectional view taken on the line VIII—VIII of Fig. 3.

The mechanism for imparting this tilting movement to the popper head is best illustrated in Fig. 8 wherein an arm 49, which is pivoted to a shaft 50 extending between the frames 10 and 11 adjacent the lower ends thereof, is shown as connected at its upper end by a link 51 with the frame 34 which supports the popper head, this connection being made by engagement with the bearing which supports the spindle 43, as illustrated in Fig. 3. Upon observing Fig. 8, it will appear that upon swinging movement of the arm 49 about its pivotal connection with the shaft 50, the popper head may be caused to move from its normal vertical position to its forwardly tilted discharge position.

The swinging movement of the arm 49 is imparted to the same by means of a cam groove 52 in a cam disc 53 rotatable upon the main shaft 12 and capable of being clutched to the main shaft to rotate therewith. A roller 54 on the arm 49 is received by the cam groove 52 so that rotation of the cam disc 53 with the shaft 12 imparts swinging movement to the arm 49 to move the popper head from its vertical to its tilted position or vice versa.

Figure 14:
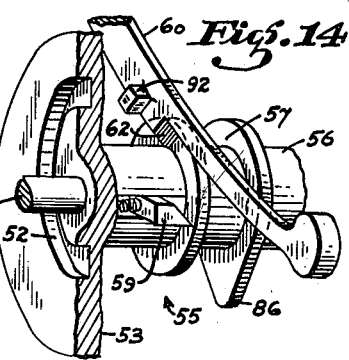
Fig. 14 is a perspective view of the clutch mechanism illustrated in Figs. 3 and 6.

When the machine is at rest, the popper head is in its tilted or discharge position and the cam disc 53 is clutched to the shaft 12 by the clutch mechanism generally illustrated at 55 in Figs. 3 and 14. This clutch comprises a collar 56 secured to the shaft 12 and provided with a perforated clutch plate 57. The cam disc 53 is normally driven by the clutch plate 57, which rotates with the shaft 12, by means of a spring-pressed clutch dog 58 provided with a squared head 59, which head 59 has an inclined surface on its inner side which may be engaged to withdraw the clutch dog 58 from the plate 57 against the tension of its spring, thereby permitting the cam disc 53 to remain at rest during rotation of the main shaft 12, (see Fig. 14).

Figure 6:
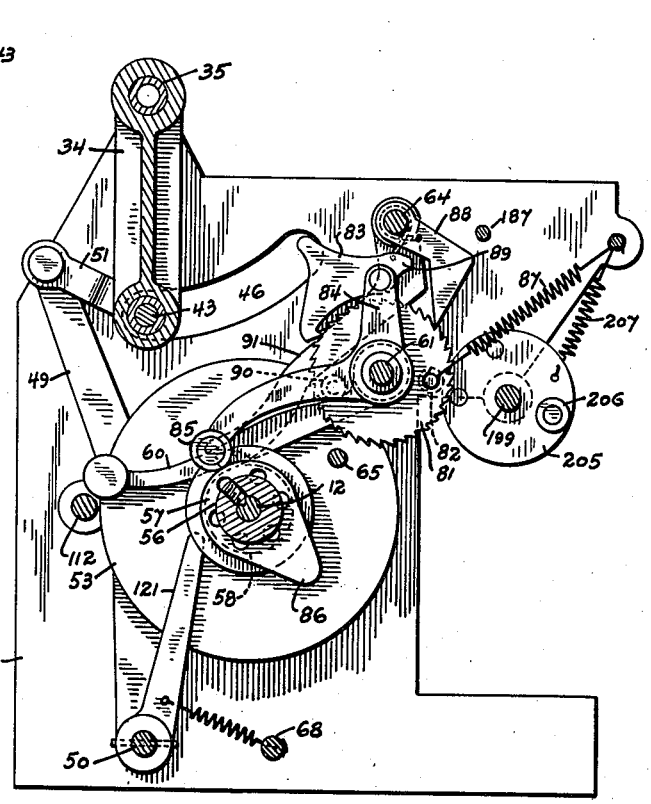
Fig. 6 is a sectional view taken on the line VI—VI of Fig. 3 showing a portion of the operating mechanism of the machine.

When the operation of the machine is started, the cam disc begins to revolve with the main shaft 12 due to its clutched engagement therewith and imparts swinging movement to the arm 49 to the extent that the popper head is moved to a vertical position. At this time a weighted lever 60, (see Figs. 6 and 14) pivoted on a stud shaft 61 and provided with a cam surface 62 causes release of the clutch mechanism so that the cam disc 53 is permitted to stop and the popper head remain in its vertical position. This release of the clutch mechanism is effected by the squared head 59 of the clutch dog 58 coming into contact with the cam surface 62 so that its inclined edge rides upon said projection and causes withdrawal of the clutch dog from the clutch plate 57. As soon as the popper head reaches its vertical position, the corn to be popped is deposited in it and the agitator blades 38 agitate the corn during the time that it is being brought to popping temperature by the heating unit 24.

As long as the weighted lever 60 remains in its lowermost position, underlying the head of the clutch dog, the cam disc 53 remains stationary and the popper head continues operation in its vertical position. When the corn is popped, the popper head must be tilted forwardly to discharge its contents. This is accomplished by raising the weighted lever 60 out of engagement with the clutch dog, thereby permitting the dog to move into one of the perforations of the clutch plate 57 so that the cam disc 53 will rotate with the shaft 12 to swing the arm 49 and move the popper head to its discharge position.

The means for raising the weighted lever 60 out of engagement with the clutch dog are most clearly illustrated in Figs. 5, 6, 7 and 10. In Fig. 5 a generally Y-shaped trip lever 63 is shown as pivoted on a shaft 64 which extends transversely between the frames 10 and 11. At the lowermost point this lever is provided with a trip pin 65 extending through the lever and fitted at one end with a roller 66. A tension spring 67 between the lever 63 and a transverse bar 68 adjacent the base member 1 normally tends to swing the lever 63 upwardly to cause the pin 65 to engage and lift the weighted lever 60. A pivoted latch 69 carried by the shaft 61 and under tension of a spring 70 engages a pawl 71 to retain the lever 63 against upward swinging movement. A triangular cam 72 rotatable with the main shaft 12 intermittently engages the roller 66, causing the lever 63 to swing downwardly upon each such engagement to release the engagement of the latch 69 with the pawl 71. However, as the latch 69 is spring-pressed against the pawl, it follows it in its downward movement and the release is not effected except in the event that the corn in the popper head has been completely popped, in which event a tension is put on the latch 69 to raise it to permit upward swinging movement of the lever 63 after it has been released by the projection on the rotating triangular cam 72.

Reference will again be made to the popper head to describe the means for effecting release of the latch 69. As stated above, the cover member 30 of the popper head is mounted for floating movement in a vertical direction. It is centrally perforated to receive a stem 73, which stem extends downwardly through the hollow spindle 40 and is provided at its upper end with a collar 74 forming a seat for the upper end of a light spring 75 which bears against the cover member at its lower end normally to retain it in its lowermost position. A short hollow shaft 76 surrounds the stem 73 directly beneath the cover member and is secured to the cover member. This shaft aligns with the upper end of the hollow spindle 40 and their abutting ends are mutilated so that upon rotation of the hollow spindle 40, the cover member is agitated or caused to jiggle up and down in a manner to prevent the corn as it pops from becoming jammed between the cover member and the wall 27 of the popper head. The lower end of the stem 73 extends through a slot in an arcuate lever 77, which lever is pivoted on the shaft 64 and provided at its opposite end with a weight 78 normally urging the arcuate end 77 upwardly.

When the corn in the popper head, the quantity of which has been carefully measured, is nearly all popped, its increased volume caused by expansion due to popping causes it to bear upwardly against the under side of the cover member 30. This upward pressure compresses the spring 75 and raises the stem 73 until a collar 79 at its lowermost end engages with the lower side of the arcuate lever 77, thus tending to raise this end of the lever and lower the weighted end 78. The weighted end of the lever is connected by a link 80 with the latch 69 so that as soon as the corn is popped and places this tension on the arcuate lever 77, the latch 69 is placed under pressure tending to relieve it from its engagement with the pawl 71. Thus, the next time that one of the projections on the triangular cam 72 engages the roller 66 and lowers the lever 63, the latch 69 is swung upwardly and when the lever 63 is released by the projection on the cam 72, it flies upwardly under the tension of its spring 67 and the pin 65 engages the under side of the weighted lever 60, thus releasing the clutch dog 58 which returns to its clutching position causing the cam disc 53 to rotate with the shaft 12 and causing the popper head to be tipped forwardly to its discharge position under influence of the lever 49.

The movement of the popper head to its discharge position is brought about as described above by raising of the cover member 30 relative to the popper head. It is possible that during the discharge of the popped corn, a piece of corn may become lodged between the popper head and the cover member, thus preventing the cover member from being returned to its normal position under influence of the spring 75. If this were to occur, it is obvious that as long as the cover member was held in its raised position, the machine would fail to operate and I have, therefore, provided means for positively lowering the cover member to its normal position relative to the popper head as the popper head returns to its vertical position. This is effected by engagement of the collar 79 with the under side of the arcuate slotted lever 77 (see Fig. 5), which engagement will cause the stem 73 to be drawn downwardly with sufficient force to replace the cover member regardless of the piece of corn lodged beneath it, which will be crushed or sheared by the cover member and thus have no tendency to interfere with the proper operation of the machine. In order to prevent the arcuate lever 77 from swinging upwardly due to engagement of the collar 79 on its lower surface, I provide a latch 77ª pivoted to the shaft 50 and urged by a spring 17ᵇ into latching engagement with the outer end of the lever 77. When the popper head is in its vertical position, the frame 34, which supports it for rocking movement, engages the upper end of the latch 77ª to release it from engagement with the lever 77.

The foregoing description illustrates the manner in which the popper head is tilted to discharge its contents when a measured amount of corn has all or practically all been popped. It is apparent, however, that if less than the proper amount of corn were deposited in the popper head or if due to some fault of the corn itself, it failed to pop sufficiently to raise the cover member of the popper head and trip the tilting mechanism, the machine would continue to operate indefinitely.

In order to prevent such accidental continuous operation of the machine, I have provided emergency tripping mechanism to cause the popper head to discharge its contents after a perdetermined period of time regardless of whether the corn has been popped. For description of this mechanism particular reference will be made to Figs. 6 and 7. The shaft 61 carries a ratchet wheel 81 freely rotatable thereon. A pin 82 is fixed to the ratchet wheel 81 in a position to engage the under side of the weighted lever 60 when the ratchet wheel is rotated in a counter clockwise direction as viewed in Fig. 7. A pawl 83 is pivoted to the upper end of a bell crank 84 also mounted on the shaft 61. The lower end of this bell crank 84 is provided with a roller 85 which occupies a position to be engaged by a cam 86, which cam is formed integrally with and projects from an edge of the perforated clutch plate 57. As the main shaft 12 rotates, the cam 86 revolves about it and intermittently engages the roller 85 to rock the bell crank 84, thereby causing the pawl 83 to engage and rotate the ratchet wheel 81. A spring 87 opposes this rotation of the ratchet wheel 81 and a second pawl 88 is spring-pressed into engagement with the ratchet wheel to retain it in its advanced position each time that it is moved by the pawl 83. Thus, for each rotation of the main shaft 12 carrying the cam 86, the ratchet wheel 81 is advanced one tooth, thus bringing the pin 82 carried by the ratchet wheel closer to its position of engagement with the under side of the weighted lever 60.

The speed of the main shaft 12 and the number of teeth in the ratchet wheel are such that in a predetermined period of time, preferably slightly longer than would be required for the complete popping of a normal charge of corn in the popper head, the pin 82 has been advanced until it engages and lifts the weighted lever 60, thus causing the cam disc 53 to be clutched to the shaft in a manner hereinbefore described to effect movement of the popper head to its discharge position.

Figure 7:
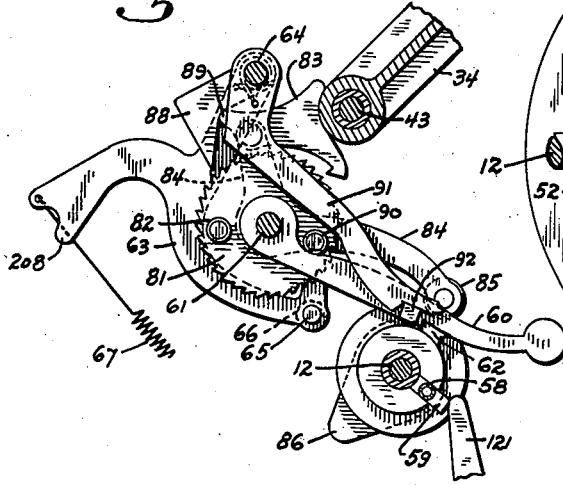
Fig. 7 is a sectional view taken on the line VII—VII of Fig. 3 showing the reverse side of part of the mechanism illustrated in Fig. 6.

As the popper head moves to its discharge position, the lowermost end of the rocker frame 34, upon which it is supported, engages the pawl 83 as illustrated in Fig. 7, lifting it away from the ratchet wheel 81 and also causing a projection 89 to engage the pawl 88 to lift it free of the ratchet wheel. Being thus released, the ratchet wheel returns to its initial position under tension of the spring 87 and a pin 90 on the ratchet wheel engages the top of the weighted lever 60, bringing the ratchet wheel to a stop and again moving the lever into position to engage the clutch dog 59 upon the next cycle of operation of the machine.

The weighted lever 60 is retained against accidental upward swinging movement by a long latch arm 91 pivoted on the shaft 64 and bearing downwardly under spring pressure against a projection 92 formed on one side of the weighted lever. When the machine begins to operate and after the ratchet wheel 81 has been rotated several teeth, the pin 90 thereon engages the safety arm 91 and lifts it free of the projection 92.

The popper head is provided with a gate in the forward portion of its frusto-conical wall 27 adapted to open when the popper head is swung to its discharge position so that the popped corn will be free to pass through a chute 93 into a bag 94 positioned in a recess 95 formed in the front wall of the casing. This gate may be formed of metal or formed, as shown, of a section 96 cut from the transparent wall 27 and supported on a metal back 97, which back has upturned arms 98 at its outer edges pivoted on a pintle 99 supported by spaced brackets 100 formed at opposite sides of the gateway and suitably secured to the flanged ring 28 which forms a part of the popper head. When the popper head is tilted to its discharge position, this gate swings open by means of a spring 99ª illustrated in Fig. 5 and when the popper head resumes its vertical position, the gate is closed by an arm 101 and is maintained closed by said arm which is pivoted at 102 and engageable with the outer lower edge of the gate and pressed thereagainst by a bar 103 extending between the upper ends of the members 98. A bracket 104 is secured within the chute 93 in a position to engage the bar 103 and positively open the gate in the event that it fails to open under influence of the spring 99ª when the popper head moves to its tilted position.

*Corn feed mechanism*

When the machine is placed in operation, the popper head, which has been left in its tilted discharge position, is first returned to its vertical position and then a measured quantity of corn to be popped is deposited upon the cover member 30 on the convex portion 31 thereof and passes through the perforations 37 to fall upon the heater unit 24.

The fresh corn is stored in the bin 9 built against the back wall of the casing as illustrated in Figs. 1 and 3, which bin is preferably formed with glass walls so that the corn may be viewed from the exterior of the casing. The bottom of the bin 9 is generally V-shaped to cause the corn therein to gravitate centrally, and the bin is provided with spaced partitions 105 and 106 dividing it into three compartments. The partitions 105 and 106 terminate short of the bottom of the bin so that the outer compartments may be filled with corn while the inner compartment will receive corn approximately to the level of the bottom edges of the partitions 105 and 106.

A corn scoop 107 is actuated at the proper time to dip corn from the central compartment of the bin 9, raise it and pour it into the popper head. The corn scoop is pivoted as at 108 to the end of a connecting rod 109 which is guided for vertical reciprocal motion through a bracket 110, this motion being imparted to the connecting rod through a crank link 111. The crank link 111 is pivotally mounted on a transverse shaft 112 and is slotted as at 113 to receive a crank pin 114 carried by a crank disc 115. The crank disc 115 is mounted on the main shaft 12 in a manner similar to that in which the cam disc 53 is mounted and is adapted to be clutched to the shaft 12 for rotation therewith at the proper time by means of a dog 116 spring-pressed into spaced perforations 117 in a clutch plate, which plate is the member forming the triangular cam 72 above referred to. The clutch dog 116 is provided with a squared head 118 identical with the head 59 on the cam disc clutch and engageable by an arm 119 (see Fig. 5) to withdraw the clutch dog from the perforations in the member 72.

The clutch release arm 119 is fixed to the shaft 50 and urged toward its clutch releasing position by a spring 120. A finger 121 (see Figs. 3 and 6) also fixed to the shaft 50 is engaged by the head 59 of the clutch dog 58 when the machine is placed in operation and swung to rotate the shaft 50 sufficiently to move the arm 119 out of engagement with the clutch dog head 118.

Thus, when the machine begins to operate, the crank disc 115 is clutched to the shaft 12 and rotates therewith to oscillate the crank link 111 to first lower and then raise the connecting rod 109 so that the rearmost end of the scoop 107 will be dipped into the corn in the central compartment of the bin 9. This end of the scoop is provided with the short wall 122, the height of which is sufficient to cause the scoop to retain a desired quantity of corn, the extra corn spilling over the edge of the wall 122 as the scoop is raised. The bottom of the scoop 107 slides over a sill 123 which forms the top edge of the front wall of the center compartment of the corn bin so that as the scoop is lowered, it assumes a substantially vertical position and as it is raised, it pivots around the point 108 under gravity until it slopes forwardly to deposit the corn picked up on the lower end of its stroke into the popper head. A pin 107ª is provided to engage the scoop during its upward movement to force it to discharge its contents in the event that it should become stuck and fail to pivot properly under its own weight.

The downward movement of the corn scoop into the bin is relatively slow due to the position of the crank pin 114 in the slot 113 of the crank link 111 and its upward movement is accordingly comparatively rapid.

After the corn has been deposited in the popper head, the scoop is returned to its starting position as illustrated in Fig. 1 and there remains at rest during the popping and discharge operations due to the fact that upon the completion of one cycle of operation of the crank disc 115, the arm 119 engages with the head 118 of the clutch dog 116 to pull the dog free of its engagement with the clutch member 72, thus permitting the crank disc to remain at rest notwithstanding the continued rotation of the main shaft 12.

*Bag feed*

As stated above, a bag is placed for the reception of the popped corn as it is discharged from the popper head. This bag is automatically delivered to the person operating the machine from a supply of bags indicated at 124 in a compartment 125 provided for this purpose in the lower right-hand portion of the casing. The bag compartment 125 comprises a sloping bottom wall 126 and an inclined front wall 127 extending from the bottom wall upwardly and terminating at a bag delivery slot 128 formed in the front wall 2 of the casing.

As the machine begins to operate, a bag is delivered from the supply 124 to a position with an edge thereof extending through the slot 128 where it may be grasped and removed by the person operating the machine, who then opens it and places it beneath the delivery chute 93 to receive the popped corn.

The means for delivering the bag through the slot 128 is illustrated in Figs. 1 and 3. Referring to these figures, a rigid bar 129 is shown as secured to a bracket 130 which is formed integrally with the tilting frame 34 which supports the popper head. A pair of spaced tubular guides 131 are carried by the bar 129 to extend in a generally vertical position directly above the bag supply in the compartment 125. Rods 132 are mounted for sliding movement through the tubular guides 131 and carry a friction foot 133 at their lower end. The friction foot 133 supports a block 134 of soft rubber or other material suitable for frictionally engaging the topmost bag of the supply 124 and also supports a forwardly extending finger 135 which assists in the ejection of a bag in a manner that will presently appear.

It will be recalled that when the machine is placed into operation, the first movements include the swinging of the popper head from its discharge position to its vertical position. Because of this movement, the bar 129, which supports the bag feeding mechanism, swings the latter mechanism forwardly to the dotted line position indicated in Fig. 1. During this forward swinging movement, the friction block 134 is resting on the topmost bag in the supply 124 and slides the same forwardly. The forward edge of this bag begins to ride up the inclined front wall 127 of the bag compartment and as the friction foot 133 approaches the front wall, the finger 135 engages the bag and urges it up the inclined front wall 127 until it projects through the slot 128 so that it may be removed therefrom by the operator, opened and placed beneath the chute 93 to receive the popped corn.

After the bag has been delivered through the slot 128, the movement of the corn feeding mechanism described above is employed to aid in the return of the bag feeder to its original position. Secured to the connecting rod 109 of the corn feeder is a bracket 136. The means for securing the bracket to the connecting rod as shown in Fig. 3 is a block 136ª drilled for the reception of both members which may be secured in a properly adjusted position therein by means of set screws such as illustrated at 136ᵇ. The bracket 136 supports a finger 137 in a position aligning with the space between the vertical rods 132 of the bag feeder.

During the time that the bag is being delivered, the corn feeder mechanism has advanced to its lowermost position so that the finger 137 lies between the vertical rods 132. Upon upward movement of the corn feeding mechanism, the finger 137 engages a crossbar 138 supported by and extending between the uppermost ends of the parallel rods 132, thus raising said rods which are free to slide upwardly through the tubular guides 131 and raising the friction foot 133 out of contact with the bags.

In normal operation, the finger 137 moves downwardly during the time that the cross bar 138 is in its forward position so that said finger will not strike the top of the bar. For the purpose of safety, however, I have pivoted the finger 137 as at 137ª for upward swinging movement only so that in the event of jamming of the bag feeding mechanism, which might result in the finger striking the top of the bar 138, it would pass freely thereover on its downward stroke without causing breakage or bending of the associated parts.

A latch bar 139 secured to the friction foot 133 and extending upwardly therefrom parallel to the rods 132 passes through a perforation 140 in the bar 129 and is bent upon itself to form a latch 141 engageable with a beveled edge 142 on the bar 129. When the bag feeder is raised by the finger 137, this latch slides upwardly through the perforation 140 and, under tension of a spring 142 arranged at its lower end, engages with the bar 129 to retain the friction foot in its elevated position.

The bag feeding mechanism remains at rest throughout the remainder of the operating cycle of the machine until the popper head has again tilted to its discharge position when the bag feeder, which is still held out of contact with the bags by the latch 141, is swung to assume the angle illustrated in full lines in Fig. 1. As the bag feeder is swung to this position, a pin 144 secured to and extending outwardly from the side wall of the bag compartment 125 engages the latch bar 139 to release engagement of the latch 141 therewith and permit the friction foot 133 to drop downwardly. This downward movement is, however, insufficient to contact the bag supply as the latch 141 engages the pin 144 and retains the bag feeder in a slightly elevated position until the machine is started, at which time the initial forward swinging movement of the bag feeder releases the latch 141 from the pin 144 and permits the friction foot 133 to engage the bags.

*Seasoning mechanism*

In order to season popped corn to enhance its taste, I have provided means for automatically mixing granulated and liquid seasoning, such for example, as salt and butter with the corn after it is popped. The time preferred for applying the seasoning is during the period that the corn is being discharged from the popper head into the bag, and due to the fact that the popped corn is light and tumbles down the chute 93 relatively slowly, I have found that by spraying the seasoning materials into the falling corn, the seasoning may be very well and evenly distributed throughout the entire contents of the bag.

In the forward uppermost corners of the casing I provide containers for the seasoning. A container for salt or other granular condiment is illustrated at 145 in Fig. 1 and a similar container 146 for a liquid seasoning, such as butter, is illustrated in Fig. 2. A pump is provided for instituting pressure in the containers 145 and 146 and automatically operated valves control the pressure to cause the seasoning to be injected into the popped corn as it falls into the bag.

These means are illustrated in detail in Figs. 2 and 11. A pump 147 is secured to the forward edge of the main frame 10. The pump 147 contains a conventional vertically reciprocable plunger 148 which is reciprocated continuously by means of a plunger rod 149 connected with a walking beam 150 which is rocked by a connecting rod 151 driven by a crank pin 152 fixed to the gear 19 on the continuously rotating main shaft 12.

The pump 147 supplies air to the butter container through a tubing 153. The pressure within the container 146 is maintained below a predetermined maximum by a suitable relief valve 154 and this pressure is sufficient to force the butter, which it should be understood is in a liquid form, through a return line 155 which communicates with a valve 156 which is positioned above the pump. The valve 156 is of the spring closed poppet type and may be opened by pressure on the upper end of its stem. Opening of the valve 156 permits butter to escape through a delivery line 157 which terminates at a point within the delivery chute 93 as illustrated in Fig. 5.

Air pressure from the pump is directed to the interior of the salt container 145 through a line 158 which is controlled by a valve 159 substantially identical in construction with the valve 156. A salt delivery line 160 forms a communication between the salt container and the chute 93 terminating in the chute as illustrated in Fig. 1.

Thus, when the valves 156 and 159 are open, both butter and salt or whatever seasoning may have been chosen are delivered to the discharge chute 93. Suitable refill plugs such as indicated at 161 and 162 are provided in the tops of the seasoning containers.

I have found it desirable to open the seasoning valves two or more times in rapid succession for each seasoning operation as in this manner the corn which is tumbling through the chute 93 becomes more uniformly coated with the seasoning materials. In order to operate the seasoning valves automatically, I provide a lever 163 pivotally mounted on a bracket 164 extending upwardly from the main frame 10. A cross arm 165 on the end of the lever 163 is arranged to overlie the tops of the valves 156 and 159 and is provided with adjusting screws such as indicated at 166, one for each of the valves. The opposite end of the lever 163 is generally arcuate in shape and is provided on its under surface with a series of projections or rounded teeth 167. The lever 163 is rocked to cause the adjusting screws 166 to engage and open the valves by means of a cam 168 which is fixed to the hollow shaft 35 which supports the popper head. Thus, when the popper head tilts forwardly to discharge its contents through the chute 93, the cam 168 rides over the teeth 167 to rock the lever 163 and open the seasoning valves several times in rapid succession.

The actual point of the cam 168 which contacts the teeth 167 is in the form of a spring-pressed pawl 169 which, upon return movement of the cam, rides over the teeth 167 without moving the lever 163 as is clearly illustrated in Fig. 8, wherein the pawl 169 is shown as pivoted at 170 and pressed by a spring 171 into engagement with a stop member 172.

*Electrical circuit*

The motor is energized and the heating unit in the popper head is energized by an electric circuit diagrammatically illustrated in Fig. 12, which circuit also includes lamps for illuminating the interior of the casing so that the working parts of the machine may clearly be observed during its operation.

A main circuit 173 supplies electrical energy to the motor 14 and to the heating element 25, which is preferably divided into two or more sections, as illustrated, and to a small auxiliary lamp 174 which serves to indicate that the motor and heating unit have been energized. The motor and heating unit and lamp 174 are all controlled by a main switch generally indicated at 175, which switch is preferably of the mercury type and which is adapted to be closed by coin actuated mechanism presently to be described.

The heating element, as illustrated in Fig. 12, consists of two separately wired sections, one of which may be cut out of the circuit by means of a switch 176 opened by a thermostatic element 177 to effect automatic control of the heat in the popper head. Under normal conditions the switch 176 will be closed so that when the machine is placed into operation, one section only of the heating element will be energized and the popper head will be brought to the desired temperature rapidly. When this temperature is reached, heat radiated to the thermostatic element 177 will cause opening of the switch 176 to cut in the other section of the heating element, thus increasing the resistance and lowering the temperature to insure that the heat in the popper head does not exceed a predetermined maximum. It should be noted that the sections of the heating element lie parallel to and adjacent each other so that the first section to be heated preheats the other section and prevents a sudden drop in temperature when the second section is cut into the circuit.

A lamp 178 may be connected directly with the circuit 173 and burn continuously within the casing to illuminate the entire machine and thus render it more attractive to a prospective purchaser of popcorn.

Figure 4:
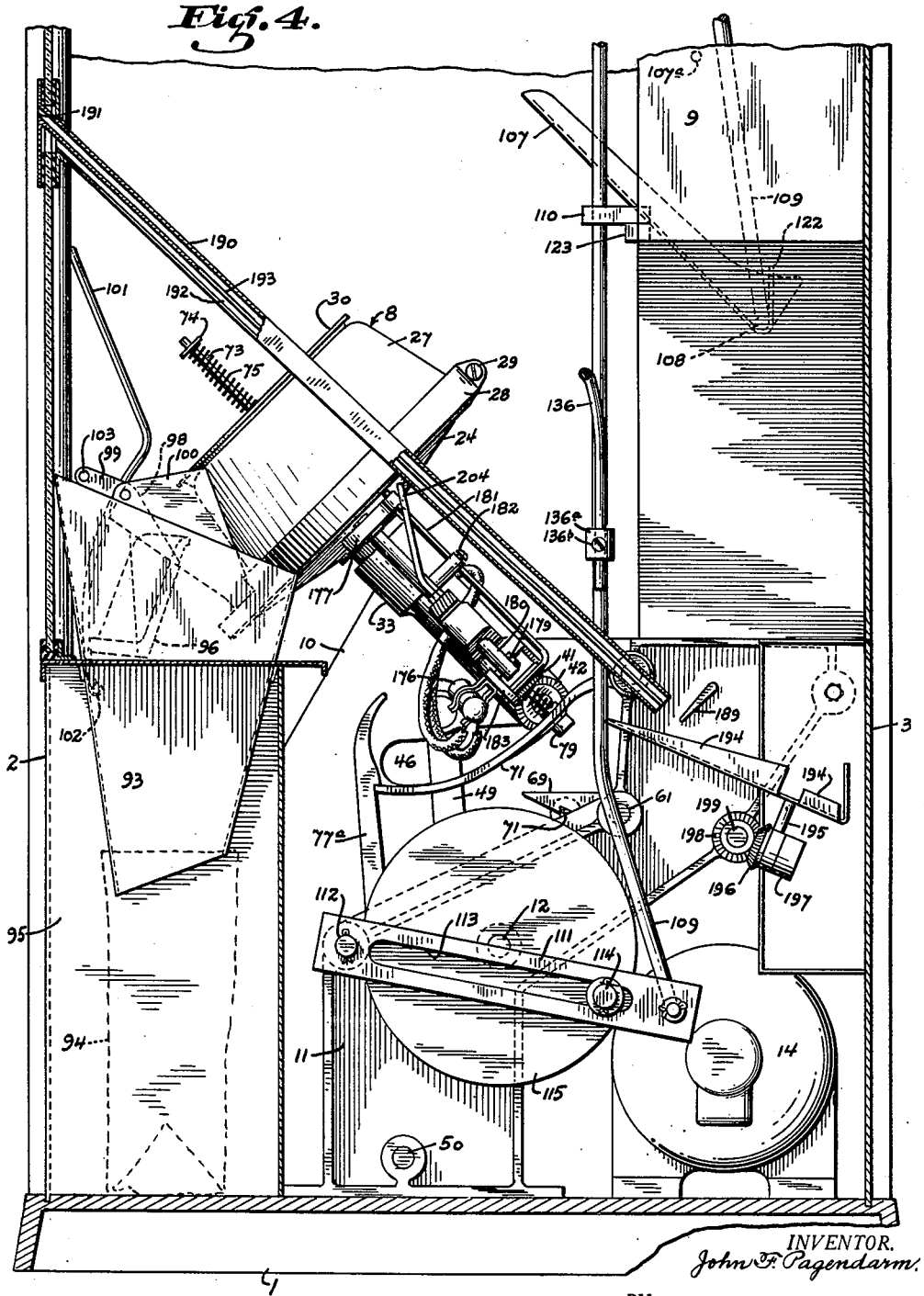
Fig. 4 is a sectional view taken on the line IV—IV of Fig. 3.
Figure 13:
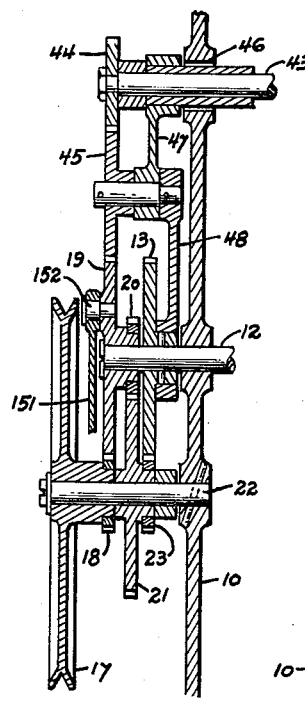
Fig. 13 is a front elevation of the reduction drive illustrated in Figs. 2 and 3.

The construction of the switch 176 and thermostatic element 177 that I have chosen to employ is best illustrated in Figs. 3 and 4. The switch 176 is of the mercury type comprising a glass capsule centrally pivoted on a pin 179 supported on a vertically extending post 180. The thermostatic element 177 is in the form of a helical bi-metallic strip arranged at the top of the post 180 and having its outer free end engageable with a lever 181 pivoted at 182 so that its lowermost end, which is bent at right angles to engage a crank 183 on the switch support will, upon expansion and contraction of the element 177, swing the switch off and on upon variations in the temperature radiating from the heater unit of the popper head.

The wiring forming the circuits illustrated diagrammatically in Fig. 11 may be led throughout the casing in any suitable manner but I prefer that the wires leading to the heating unit of the popper head be encased in a suitable insulating member and passed through the hollow shaft 35, as illustrated in Fig. 3, so that they will not be unduly twisted or stretched by the tilting motion of the popper head.

The main switch 175 is mounted at the upper rear portion of the supporting frame 10 as illustrated in Fig. 2 and is actuated to close the circuit, energizing the motor and heating unit upon deposit of a coin in the machine.

*Coin controlled starting mechanism*

The operation of the machine is controlled by the main switch 175. This switch, as illustrated in Fig. 2, is mounted rearwardly of the frame 10 and is of the type which consists of a glass capsule containing sufficient mercury to form a contact between two terminals extending to within the capsule when the switch is in a horizontal position and adapted to break the circuit between these two terminals when the switch is tilted to the position illustrated in Fig. 2. The switch is normally urged toward a circuit closing position by a spring 184 which tends to pivot it on its supporting pin, which pin extends through the frame 10 and is bent at its opposite end to form a crank 185 as illustrated in Fig. 8. A trigger 186 secured to a rotatable shaft 187 engages the crank 185 to retain the switch in its open position as shown, this being the normal position of the switch when the machine is at rest. Upon referring to Fig. 8, it will appear that upon slight rotation of the shaft 187 in a counter clockwise direction, the trigger 186 will release the crank 185 so that the switch will snap to its circuit closing position with the crank 185 coming to rest against a pin 188.

The movement of the shaft 187 necessary to close the circuit and cause the machine to operate is derived from a coin of the proper denomination being placed in the machine. The shaft 187 extends transversely of the machine, being journaled in the main frames 10 and 11, and terminates at its opposite end in a finger 189 disposed at right angles to the axis of the shaft proper and arranged in alignment with the open end of a coin chute 190 which is inclined to form communication with a coin slot 191 formed in the upper portion of the front wall of the machine. A coin of the denomination selected, deposited in the slot 191, slides rapidly through the chute 120, strikes the finger 189, thus imparting sufficient rotation to the shaft 187 to trip the trigger 186 and energize the motor and heating unit to start the operation of the machine.

Directly beneath the coin chute 190 and parallel therewith is a second chute 192. The coin chutes 190 and 192 are divided by narrow flanges 193, as illustrated in Fig. 3, so that a coin of the selected denomination will pass down the chute 190 while a smaller coin will not be supported in the chute 190 but will fall through to the chute 192 and pass outwardly through the lower end thereof without engaging the finger 189 to operate the machine. Thus, for example, if the machine is to be operated with a five-cent piece, a penny or any spurious coin that is only slightly smaller in diameter than a five-cent piece will fail to place the machine in operation.

Figure 10:
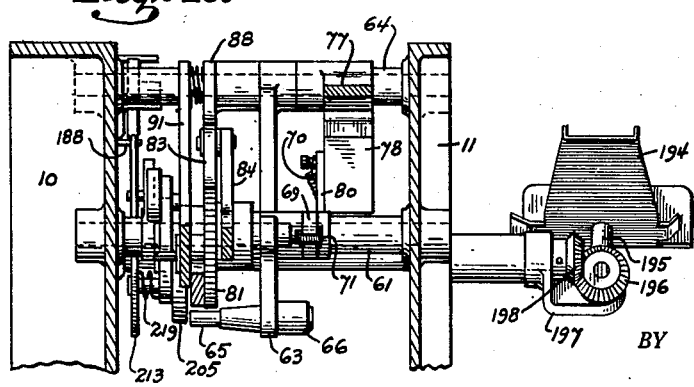
Fig. 10 is a sectional view taken on the line X—X of Fig. 8.

After the coin has passed through the chute 190 and engaged the finger 189, it falls into a cradle 194 (see Figs. 1, 4 and 10). The cradle 194 is supported by a post 195 secured to and extending upwardly from a bevel gear 196 which is supported for rotation on a bracket 197. A bevel gear 198 meshes with the gear 196 and is fixed to a shaft 199 so that upon rotation of the shaft 199 in one direction, the cradle 194 will be tilted to deposit the coin into a receptacle 200. Upon rotation of the shaft 199 in the opposite direction, the coin will be deposited in a funnel 201 in which it will pass to a chute 202 for returning it to a coin return recess 203 formed in the lower portion of the front face of the machine. This return of the coin to the purchaser being effective upon failure of the machine to operate properly and deliver a full bag of popped corn.

In order to prevent the passage of a coin through either of the chutes 190 and 192 during the time that the machine is operating, I provide a finger 204, as shown in Figs. 3 and 4, secured to and extending upwardly from the bar 129, which bar moves upon tilting of the popper head. When the machine is at rest, the popper head is in its forward tilted position and the finger 204 does not obstruct passage of coins through the chutes 190 and 192. However, when the machine operates and the popper head moves to its vertical position, the finger 204 moves into the chutes 190 and 192, the bottom wall thereof being slotted for its reception, and obstructs any coin that is inserted through the slot 191. Whatever coin or coins may be inserted in the slot at the improper time and obstructed by the finger 204 are released when the popper head again moves to discharge its contents. The coins then pass into the cradle 194 which then deposits them into the coin return chute.

The mechanism for rocking the cradle 194 through the shaft 199 is illustrated in Fig. 5 wherein the shaft 199 is shown as carrying a crank disc 205 provided with a crank pin 206. Clockwise rotation of the crank disk 205 moves the shaft 199 to rock the cradle 194 through means of the bevel gears 198 and 196 to deposit the coin in the receptacle 200. A spring 207 normally resists clockwise movement of the disc 205. However, when the corn in the popper head is completely popped, it will be recalled that the Y-shaped trip lever 63 swings about its supporting shaft 64 to bring into operation the mechanism that clutches the cam disc 53 to the main shaft. Upon this movement of the trip lever 63 an arm 208 thereof strikes the crank pin 206 on the disc 205 to rotate the cradle actuating shaft 199 and cause the coin to be deposited in the receptacle just prior to the delivery of the popped corn to the purchaser.

After the corn has been discharged, the machine is brought to rest by breaking the circuit through the switch 175. The mechanism for returning the switch 175 to its circuit breaking position is illustrated in Fig. 8. This mechanism includes a lever 209 pivotally mounted on the shaft 61 and adapted upon upward swinging movement to engage the crank 185 and lift it to a position where the switch 175 will break the circuit, in which position the crank will be retained by the trigger 186.

In order to actuate the lever 209 at the proper time, I have provided a lever 210 centrally pivoted on the shaft 61 and having a roller 211 at one end engageable by a cam 212 carried peripherally on the cam disc 53. Engagement of the cam 212 with the roller 211, which occurs immediately after the corn has been discharged from the popper head, swings the opposite end of the lever 210 downwardly. This end of the lever carries a plate 213 pivoted to the lever at its lower end by a pin 214. A spring 215 normally urges the lever and plate upwardly. When the lever 210 is swung downwardly by the cam 212, the plate 213 is drawn downwardly and this plate is provided with a slot 216 embracing a pin 217 on the lever 209. The upper end of the slot 216 is provided with an offset 218 so that as the plate moves downwardly, the offset 218 registers with the pin 217 and the pin is received by the offset due to the pressure of a small spring 219 (see Fig. 10) which causes the plate to swing slightly about its pivotal support. When the cam 212 has passed the roller 211, the lever 210 is drawn upwardly by the spring 215 and through engagement of the pin 217 with the offset 218, the lever 209 is raised to move the switch to a position breaking the circuit and terminating the operation of the machine.

The plate 213 is also provided with a slot 220 which embraces the shaft 199 and has an edge engageable with the shaft and which edge is so inclined that upon the final upward swinging movement of the lever 210, the plate will be swung to a position where the pin 217 will be released by the offset 218 and the lever 209 will be free to fall to its original position.

Just prior to the stopping of the machine, the coin cradle is rocked so that any coin that happens to be in it will be deposited in the coin return chute. This is effected by the lever 210 which is provided with a finger 221 which, upon downward movement of the lever 210, engages a pin 222 carried by the disc 205 opposite the position of the pin 206 on the same disc. An additional pin 223 also carried by the disc 205 is engageable with the upper surface of the finger 221 to limit the rocking movement of the cradle.

The operation of the coin control mechanism may be summarized as follows: A coin of the proper denomination inserted in the coin chute 190, after tripping the switch to close the circuit which puts the machine in operation, remains in the cradle 194 until the corn is popped and the popper head is ready to discharge its contents. At this time the coin cradle is rocked to deposit the coin in the coin receptacle 200. If the charge of corn in the popper head is insufficient to provide a full bag of popped corn to the purchaser, the proper head will not be moved forward by the usual mechanism which includes the Y-shaped lever 63 and, consequently, this lever will not actuate the coin cradle to deposit the coin in the receptacle. It has been stated, however, that at the end of the operation of the machine and just before the circuit is broken by the switch 175, the coin cradle is rocked to deposit its contents in the coin return chute regardless of whether the machine is operated satisfactorily. Therefore, if a full bag has been delivered to the customer, the coin in the cradle will already have been deposited in the coin receptacle and the final rocking movement of the cradle toward the coin return chute will be without result but if the corn has not been fully popped, the coin will have remained in the cradle and will be returned to the customer.

Incidentally, any coin that has been deposited in the chute 190 during the time that the machine was operating will have been retained midway between the ends of the chute by the finger 204, but as the popper head tilts forwardly to discharge its contents prior to the final rocking movement of the coin cradle 194, any such inadvertently inserted coins will be released to the cradle 194 and returned to the customer as the machine is coming to rest.

A conventional counter mechanism such as indicated at 224 in Fig. 2 and operable by a lever 225 is connected with the shaft 199 by means of a crank 226 and a resilient link in the form of a coil spring 227 so that upon each operation of the shaft 199 to rock the coin cradle in a direction to deposit its coin in the coin receptacle, the counter will be actuated. In this manner the number of times that the machine has been successfully operated will appear on the dials of the counter mechanism indicating the number of coins that should have been deposited in the coin receptacle.

The front and side walls of the casing are preferably of glass to disclose the moving parts of the machine and thus provide an interesting and entertaining spectacle which plays an important part in inducing observers to make a purchase.

In order to obtain a bag of freshly popped and seasoned corn the purchaser has only to deposit a coin in the slot and position the bag which is ejected by the machine below the discharge chute. The entire operation of the machine which includes starting, feeding corn to the popper, ejecting a bag, popping the corn, discharging the popped corn, seasoning the discharging corn and returning the coin in the event of failure of the corn to pop properly is automatic.

While I have shown and described my invention more or less specifically, it is, of course, to be understood that various changes may be resorted to in the construction and arrangement of its several parts within the spirit and scope of the appended claims.

Having thus described my invention, what I claim and desire to secure by Letters Patent is:

1. In a machine for popping corn, a popper head including means for heating and agitating a charge of corn to be popped, means controlled by expansion of the corn as it pops for effecting discharge of the corn from the popper head, means for discharging the corn from the popper head automatically upon failure of the corn to actuate the discharge means within a predetermined period of time, coin-controlled means for starting the machine, and means within the machine to return the coin employed for starting the machine in the event of failure of the corn to actuate the discharge means.

2. In a machine for popping corn, a heated popper head in which the corn is popped, a cover for said popper head mounted for vertical movement relative thereto, means for discharging corn from the popper head, means effective upon raising of said cover by the expansion of the popping corn to actuate said discharging means, and means for agitating said cover during the popping of the corn to prevent lodging of a piece of corn between the cover and the popper head.

3. In a corn popping machine, a popper head movable from a popping position to a discharge position, means for feeding corn to the popper head in its popping position, a slotted receptacle for a supply of bags, a bag ejecting member engageable with a bag in said supply to move it through said slot upon movement of the popper head to its popping position, means operable by said feeding means to raise the bag ejecting member out of contact with the bag supply, and means for moving the ejecting member to its original position upon movement of the popper head to its discharge position.

4. In a corn popping machine including means for popping and discharging a quantity of corn through a discharge chute, a container for liquid seasoning, a container for granular seasoning, a pump for creating a source of compressed air, conduits connecting said pump and said containers and leading to said discharge chute, valves controlling flow through said conduits, and means operable upon discharging of the corn for opening said valves to spray the corn with liquid and granular seasoning as it falls through the chute.

5. In a machine for popping corn, means for heating and agitating corn to be popped, an electric circuit for energizing said heating and agitating means, a switch controlling said circuit, a coin chute, means actuated by a coin passing through said chute for closing said switch, a coin receptacle, a coin return chute, and means effective upon the delivery of a full charge of popped corn by the machine to direct the coin to the receptacle, and effective upon failure of a full charge being delivered to direct the coin to the coin return chute.

6. In a machine for popping corn, means for heating and agitating corn to be popped, means for energizing the heating and agitating means, control means, means actuated by insertion of a coin in the machine for operating said control means, a coin receptacle, a coin return chute, and means effective upon the delivery of a full charge of popped corn by the machine to direct the coin to the receptacle and effective upon failure of a full charge being delivered to direct the coin to the coin return chute.

7. In an automatic corn popping machine, a popper head mounted for rocking movement to and from a discharge position and normally disposed in its discharge position, means effective upon operation of the machine to move the popper head away from its discharge position, a bag supply, and means controlled by the popper head to deliver a bag from said supply.

8. In an automatic corn popping machine, a popper head mounted for rocking movement to and from a discharge position and normally disposed in its discharge position, a bag supply, and an arm supported for movement with the popper head and having a portion engaging the topmost bag of said supply to deliver the same from the supply upon movement of the popper head away from its discharge position.

9. In an automatic corn popping machine, a popper head comprising annular side walls, a gate formed in the side walls and pivoted for vertical swinging movement, means for rocking the popper head to a discharge position, and means engageable with said gate to swing it open and closed upon rocking movement of the popper head respectively to and from its discharge position.

JOHN F. PAGENDARM.